US012670325B2

(12) United States Patent
Bensoussan et al.

(10) Patent No.: US 12,670,325 B2
(45) Date of Patent: Jun. 30, 2026

(54) USE OF LARGE LANGUAGE MODEL IN SOURCE-TO-PAY PLATFORM

(71) Applicant: Ivalua SAS, Massy Cedex (FR)

(72) Inventors: Pascal Bensoussan, Redwood City, CA (US); Xuan Khanh Do, Massy Cedex (FR)

(73) Assignee: Ivalua SAS, Massy Cedex (FR)

( * ) Notice: Subject to any disclaimer, the term of this patent is extended or adjusted under 35 U.S.C. 154(b) by 143 days.

(21) Appl. No.: 18/805,249

(22) Filed: Aug. 14, 2024

(65) Prior Publication Data

US 2026/0050738 A1 Feb. 19, 2026

(51) Int. Cl.
| *G06F 40/284* | (2020.01) |
| *G06F 40/30* | (2020.01) |
| *G06F 40/40* | (2020.01) |
| *G06N 5/02* | (2023.01) |

(52) U.S. Cl.
CPC ............ *G06F 40/284* (2020.01); *G06F 40/30* (2020.01); *G06F 40/40* (2020.01); *G06N 5/02* (2013.01)

(58) Field of Classification Search
CPC ........ G06F 40/284; G06F 40/40; G06F 40/30; G06N 5/02
See application file for complete search history.

(56) References Cited

U.S. PATENT DOCUMENTS

| 6,266,664 B1 * | 7/2001 | Russell-Falla | ...... G06F 16/9535 |
| | | | 707/999.005 |
| 8,447,602 B2 * | 5/2013 | Bartosik | ............... G06F 40/232 |
| | | | 704/235 |

| 9,619,735 B1 * | 4/2017 | Lineback | ............. G06N 3/0464 |
| 10,565,498 B1 * | 2/2020 | Zhiyanov | .............. G06F 40/284 |
| 10,853,579 B2 * | 12/2020 | Laxman | ................. G06N 3/006 |
| 10,878,174 B1 * | 12/2020 | Vontobel | .......... G06Q 10/06398 |
| 11,106,690 B1 * | 8/2021 | Dhillon | .............. G06F 16/2468 |
| 11,481,434 B1 * | 10/2022 | Venti | ....................... G06F 40/30 |
| 11,532,301 B1 * | 12/2022 | Hajebi | .................... G06F 40/35 |
| 11,861,320 B1 | 1/2024 | Gajek et al. |

(Continued)

FOREIGN PATENT DOCUMENTS

| AU | 2011255614 A1 * | 11/2012 | ....... G06F 16/24578 |
| AU | 2014233517 A1 * | 9/2015 | ............. G10L 15/22 |

(Continued)

*Primary Examiner* — Mohammad K Islam

(74) *Attorney, Agent, or Firm* — EIP US LLP

(57) ABSTRACT

There is provided a computer implemented method of using a large language model (LLM) in a Source-to-Pay platform. The method comprises receiving a user query associated with context data; estimating a number of tokens associated with the context data and dividing the context data into a plurality of context data parts each having an estimated number of tokens below a maximum number of tokens per transaction associated with the LLM; determining a user intent from the user query and selecting one or more of a plurality of predetermined processing workflows based on the user intent; processing the context data parts according to the selected workflow to generate one or more LLM prompts each comprising a respective context data part; forwarding the one or more LLM prompts to the LLM and receiving a respective response; and using at least some content from the one or more responses to generate an answer to the user query.

20 Claims, 8 Drawing Sheets

(56) References Cited

U.S. PATENT DOCUMENTS

| | | | |
|---|---|---|---|
| 12,039,263 B1 | 7/2024 | Mondlock et al. | |
| 12,216,713 B1 * | 2/2025 | Shapira | G06F 16/90332 |
| 12,411,841 B2 * | 9/2025 | Almaer | G06F 8/30 |
| 2003/0115191 A1 * | 6/2003 | Copperman | G06F 16/90332 |
| | | | 707/E17.139 |
| 2012/0215776 A1 * | 8/2012 | Guha | G06F 16/951 |
| | | | 707/E17.064 |
| 2015/0278341 A1 * | 10/2015 | Shen | G06F 16/9538 |
| | | | 707/730 |
| 2016/0323398 A1 * | 11/2016 | Guo | H04L 67/535 |
| 2017/0127016 A1 * | 5/2017 | Yu | G06N 3/084 |
| 2017/0323636 A1 * | 11/2017 | Xiao | G06F 40/30 |
| 2018/0077101 A1 * | 3/2018 | Desouza Sana | G06Q 10/107 |
| 2019/0108228 A1 * | 4/2019 | Zeng | G06F 16/24522 |
| 2020/0118544 A1 * | 4/2020 | Lee | G10L 15/063 |
| 2020/0356653 A1 * | 11/2020 | Cho | G06F 21/36 |
| 2021/0201351 A1 * | 7/2021 | Nag | G06N 3/08 |
| 2022/0366901 A1 * | 11/2022 | Rathaur | G06F 16/245 |
| 2023/0134791 A1 * | 5/2023 | Londeree | G06F 16/93 |
| | | | 706/50 |
| 2023/0419952 A1 * | 12/2023 | Desai | G06F 40/35 |
| 2024/0202225 A1 | 6/2024 | Siebel et al. | |
| 2024/0296293 A1 * | 9/2024 | Tsun | G06F 40/35 |
| 2024/0362209 A1 * | 10/2024 | Almaer | G06F 16/245 |
| 2025/0036670 A1 * | 1/2025 | Cheng | G06F 16/3344 |
| 2025/0036673 A1 * | 1/2025 | Weber | G06N 3/044 |
| 2025/0086213 A1 * | 3/2025 | Dilipkumar | G06F 16/24522 |
| 2025/0278417 A1 * | 9/2025 | Mui | G06F 40/30 |

FOREIGN PATENT DOCUMENTS

| | | | | | |
|---|---|---|---|---|---|
| AU | 2015210460 A1 * | 9/2015 | | G10L 15/183 |
| CN | 110998565 A * | 4/2020 | | G06N 3/08 |
| EP | 3514694 B1 * | 12/2022 | | G06F 40/253 |
| EP | 4312147 A2 | 1/2024 | | G10L 15/197 |
| WO | WO-2013157603 A1 * | 10/2013 | | G06F 16/955 |
| WO | WO-2015039165 A1 * | 3/2015 | | G06F 16/24578 |
| WO | WO-2017160341 A1 * | 9/2017 | | G10L 15/22 |
| WO | WO-2021119064 A1 * | 6/2021 | | G06N 3/09 |
| WO | WO-2023017320 A1 * | 2/2023 | | G10L 15/22 |
| WO | WO-2025064373 A1 * | 3/2025 | | G10L 15/005 |
| WO | WO-2025095958 A1 * | 5/2025 | | G06N 3/084 |
| WO | WO-2025107166 A1 * | 5/2025 | | G06F 16/24522 |
| WO | WO-2025128894 A1 * | 6/2025 | | G06F 40/20 |
| WO | WO-2025151181 A1 * | 7/2025 | | G06N 3/084 |

* cited by examiner

300

400

450

500

530

570

575 — Determine embeddings for each chunk

580 — Perform vector search on each chunk based on user intent, to find sub-set of chunks 585 — Generate LLM prompt using subset of chunks, user intent and workflow template 590 — Output answer using LLM response

USE OF LARGE LANGUAGE MODEL IN SOURCE-TO-PAY PLATFORM

BACKGROUND OF THE INVENTION

Field of the Invention

The present application relates to improving functionality and user interaction in Source-to-Pay platforms using Large Language Models (LLM).

Description of the Related Technology

Source-to-Pay platforms assist commodity managers, enterprise buyers, and account payable professionals to conduct market research, manage supplier relationships, author and negotiate contracts, search for products, compare prices, and electronically purchase and order products, and validate tax compliance and pay invoices. Such Source-to-Pay systems may include an electronic catalog with information from multiple suppliers. Source-to-Pay Source-to-Pay platforms also allow buyers to set up new suppliers and to automate various aspects of the associated product searching, purchasing, invoicing and payments functions. This requires Source-to-Pay Source-to-Pay platforms to manage and deploy large amounts of data whilst attempting to simplify these processes for buyers in order to prevent overwhelm and mistakes.

Generative Artificial Intelligence (GenAI) functionality may be implemented using Large Language Models (LLM). However, whilst offering many potential benefits, LLM suffers from a number of challenges which limit its applicability to Source-to-Pay Source-to-Pay platforms and services. In the context of sourcing and procurement processes where large amounts and disparate types of information must be considered, it can be challenging to deploy GenAI functionality. Another issue is unconstrained or unchecked "creativity" which can lead to the generation of false information. In addition, different enterprises have different levels of maturity in their sourcing and procurement processes leading to different and unique implementation requirements.

SUMMARY

According to a first aspect, there is provided a computer-implemented method of using a large language model (LLM) in a Source-to-Pay Source-to-Pay platform. The method comprises receiving a user query associated with a context data, estimating a number of tokens associated with the context data and dividing the context data into a plurality of context data parts each having an estimated number of tokens below a maximum number of tokens per transaction associated with the LLM, determining a user intent from the user query and selecting one of a plurality of predetermined processing workflows based on the user intent, processing the context data parts according to the selected workflow to generate one or more large language model (LLM) prompts each comprising a respective context data part, forwarding the one or more LLM prompts to the LLM and receiving a respective response, and using at least some content from the one or more responses to generate an answer to the user query.

This method improves configurability and simplifies user interaction, enabling non-expert users to navigate and more fully utilize a Source-to-Pay platform using LLM's whilst managing technical implementation challenges such as limited processing capacity of LLM's as well as their generation of inaccurate or misdirected information. The method also is compatible with a very configurable and flexible application environment where customers can extend the data model with new data fields, extend a user interface with new pages, new tabs, and new controls, and govern the overall application experience with custom data visibility, data processing and navigation logic. As such, this method allows for supporting configurable Generative AI use cases unique to each implementation which in turn may accelerate adoption and create maximum value for our customers without forcing an enterprise's R&D team or software developers to become the bottleneck for coding and releasing new use cases.

According to a second aspect, there is provided a Source-to-Pay platform for use with a large language model (LLM), the platform having a processor and memory comprising processor readable instructions which when executed on the processor, cause the processor to: receive a user query from a user device, the user query associated with a context data, determine a user intent parameter using the user query, estimate a number of tokens for processing the context data in a transaction associated with the LLM, responsive to determining that the estimated number of tokens exceeds a maximum number of tokens per transaction associated with the LLM, (also known as the context window of the LLM) divide the context data into a plurality of context data parts, each context data part having an estimated number of tokens below the maximum number of tokens, select one of a plurality of predetermined processing workflows based on the user intent parameter, process the context data parts according to the selected processing workflow to generate one or more LLM prompts comprising respective context data parts, transmit the one or more LLM prompt to the LLM and receiving respective response data from the LLM, process at least some of the received response data to generate user response data, and transmit a user response message to the user device, the user response message based on the user response data.

Corresponding systems and computer program products are also provided.

BRIEF DESCRIPTION OF THE DRAWINGS

Various features of the present disclosure will be apparent from the detailed description which follows, taken in conjunction with the accompanying drawings, which together illustrate, features of the present disclosure, and wherein.

DETAILED DESCRIPTION OF CERTAIN EMBODIMENTS

Examples address some of the limitations of using GenAI functionality implemented using LLM in a Source-to-Pay platform. Examples allow for improving the functionality of the Source-to-Pay platform, improving user experience and enabling user interaction even with limited experience or knowledge of the platform. Further, examples may allow for user-specific configurability of the Source-to-Pay platform using no-code solutions.

Figure 1:
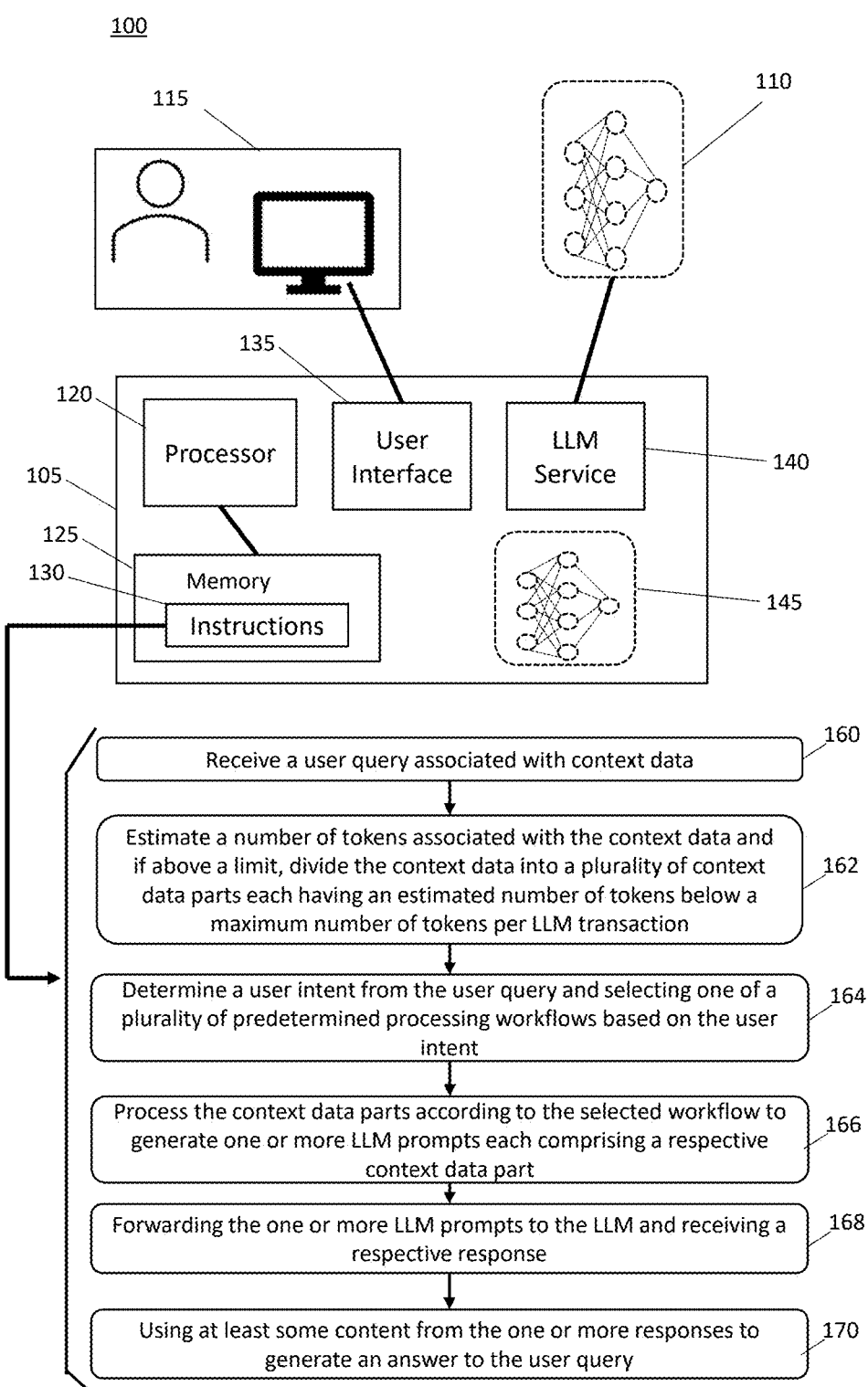
FIG. 1 is a schematic diagram of a Source-to-Pay system utilizing Large Language Models (LLM), according to an example.

FIG. 1 is a schematic diagram of a Source-to-Pay system 100 according to an example and which includes a Large Language Model (LLM) which is used to help respond to user queries. The Source-to-Pay system 100 comprises a Source-to-Pay platform 105, a LLM 110 and one or more users 115. The LLM 110 may be an external LLM such as Open AI ChatGPT™, Anthropic Claude™ or Google Genini™, and/or may be an internal LLM provided as part of the Source-to-Pay platform 105 such as Llama-3 open-sourced by Facebook or Mixtral open-sourced by Mistral. The users may be employees of a purchasing company that subscribes to or otherwise uses the Source-to-Pay platform to source and purchase products and services offered by suppliers that are available on the platform. In other examples, users may be external users such as suppliers responding to requests for proposals, redlining contracts, acknowledging an order, or sending an invoice.

The Source-to-Pay platform 105 comprises a processor 120 and memory 125 which may be configured to provide: a user interface 135 for interfacing with a user; an LLM Service to interface with an external LLM 110 and/or an internal LLM 145. The processor 120 and memory 125 may provide resources for implementing the internal LLM 145. The memory 125 may comprise Random Access Memory (RAM) and/or storage such as a hard disk or a solid-state storage device.

The user interface 135 may be a Graphical User Interface (GUI) which provides a structured way for a user to interact with the Source-to-Pay platform, for example using predetermined forms for completing. The GUI may provide a chat capability in which the user can interact with the Source-to-Pay platform using a series of questions and answers. The GUI may also be configurable to allow different users to add new functions. In some examples, an audio user interface may be provided.

The memory 125 comprises processor readable instructions 130 to answer user queries using the LLM 110 and/or 145. The instructions 130 include a sequence of instructions 160-170 which may be carried out by the processor 120. At 160, a user query is received and which is associated with context data. The user query may be provided in natural language via a chat service and/or may be provided using structured data input using a form. The context data is data associated with the user query and may include for example a document referred to by the user or input by the user, for example by "cutting and pasting" part of a document, "pasting" the full document into chat history or linked to a document already stored in the Source-to-Pay platform 105. The context data may also include the chat history, results from related Internet searches, information from user documents and information collected from other services such as automated workflows.

At 162, an estimate of the number of tokens associated with the context data is determined. If above a limit for the LLM 110, 145 to be used, the context data is divided into a plurality of context data parts, each having an estimated number of tokens below a maximum number of tokens per LLM transaction. Tokens are the basic units of data processed by LLMs and may correspond approximately to a word, part of a word or even a character. The process of tokenization takes a user query and breaks that query into a sequence of tokens—this process may be different for different LLM. An LLM transaction comprises a prompt (a question for the LLM to answer and which may include background data and/or the content of a document) as well as a response from the LLM. The total number of tokens involved in an LLM transaction includes the tokens in the prompt and in some cases the response. Each type of LLM will have its own maximum number of tokens per transaction. If the tokens in the prompt (and those estimated for a response) are above the limit for the LLM, then some action to address this must be taken or the LLM will simply return an error.

In this example, if the estimated number of tokens exceeds the token limit for the LLM to be queried (called the contextual window), then the context data is divided into a plurality of content data parts which will be further assessed and/or used in multiple prompts to the LLM in order to answer the user query whilst managing the LLM's contextual window. The content data parts are also referred to herein as "chunks" or chunks of context data.

At 164, the user's intent is determined from the user query and in some cases the context data. The user's intent may be determined from a user selection such as button on the GUI, by identifying predetermined words in the user query, and/or by providing the user query to the LLM in a predetermined prompt asking for the user's intent, this may be accompanied by some of the context data such as chat history. Determining user intent may be implemented by attempting to match the user query and/or context data with one or more of a plurality of predetermined user intent parameters, or else returning an error indicating that more input from the user may be required.

One of a plurality of predetermined processing workflows may then be selected based on the determined user intent parameter. Some examples of processing workflows include: translate document X, summarize document X, ask a question of document X such as identify risks in a contract, compare document X with document Y. The workflows may gather data, follow a pre-determine algorithm or procedure, leverage a specific internal or external tool (such as an internal library or an external search engine API), and prepare LLM specific prompts based on user intent and the user query. This may include populating a template prompt using the gathered data. The gathered data may include responses from previous prompts, for example those relating to other chunks of context data. The objective of the workflow (or method) is to ground the LLM with factual and relevant data, minimize LLM hallucination, and optimize the quality of the response to the original user request.

At 166, the context data parts or chunks are processed according to the selected processing workflow to generate one or more prompts each comprising a respective chunk. This ensures that the LLM's token processing limit per transaction is not exceeded. In a simple example, the chunks of a large document are added to respective prompts which ask the LLM to translate the content. For example, each prompt may include:

"Translate the following content into French:

[Chunk #]"

Where # is the number of the chunk of the large document.

In a more complex example, the LLM may be prompted to summarize a first chunk, with the processing workflow receiving the summary response and adding this to the content of the next chunk and asking the LLM to summarize the combination of content. This is because individually and separately summarizing chunks may remove any context or association between them resulting in a series of disparate summaries which cannot be further combined. By including the summary of one chunk with the full content of the next chunk in the next prompt, the relationship between the two chunks is maintained and so the combined summary will have greater value and meaning to a user. Other types of workflows may also rely on mapping the response from one prompt to a next prompt. For example, a query relating to the expiration of a contract involve may prompts involving summarizing chunks to identify a relevant contract term and then combining this summary with prompts for identifying an Effective Date in other chunks. Another example might include the combination of multiple processing workflows such as extracting a section from a contract about environmental protection, then translating that section in the language of the supplier country, then searching the internet to find environmental protection regulations in this country, and then checking any compliance issues between the translated section and the local regulation.

In yet another example, the number of chunks to be queried may be filtered depending on user intent. This may avoid misleading answers and/or reduce the amount of processing required by the LLM. For example, if a user query relates to the risks associated with a document, the chunks of the document may be semantically filtered to find a subset of relevant chunks, such as those referring to indemnification. A prompt may then be generated for each of the subset of chunks.

At 168, the prompts are forwarded to the LLM and respective responses received. Depending on the workflow, the prompts may be sent in a sequence that awaits the response from an earlier prompt.

At 170, the content of at least one response is used to answer the user query. The answer may be provided in the GUI and/or may be provided in a new document to which the user is referred. In the simple translation workflow noted above, the received responses are simply combined in chunk order. However, in the summary workflow, only the content from the final response may be included in the answer to the user's query. Various other post-processing steps may be employed depending on the selected workflow.

Figure 2:
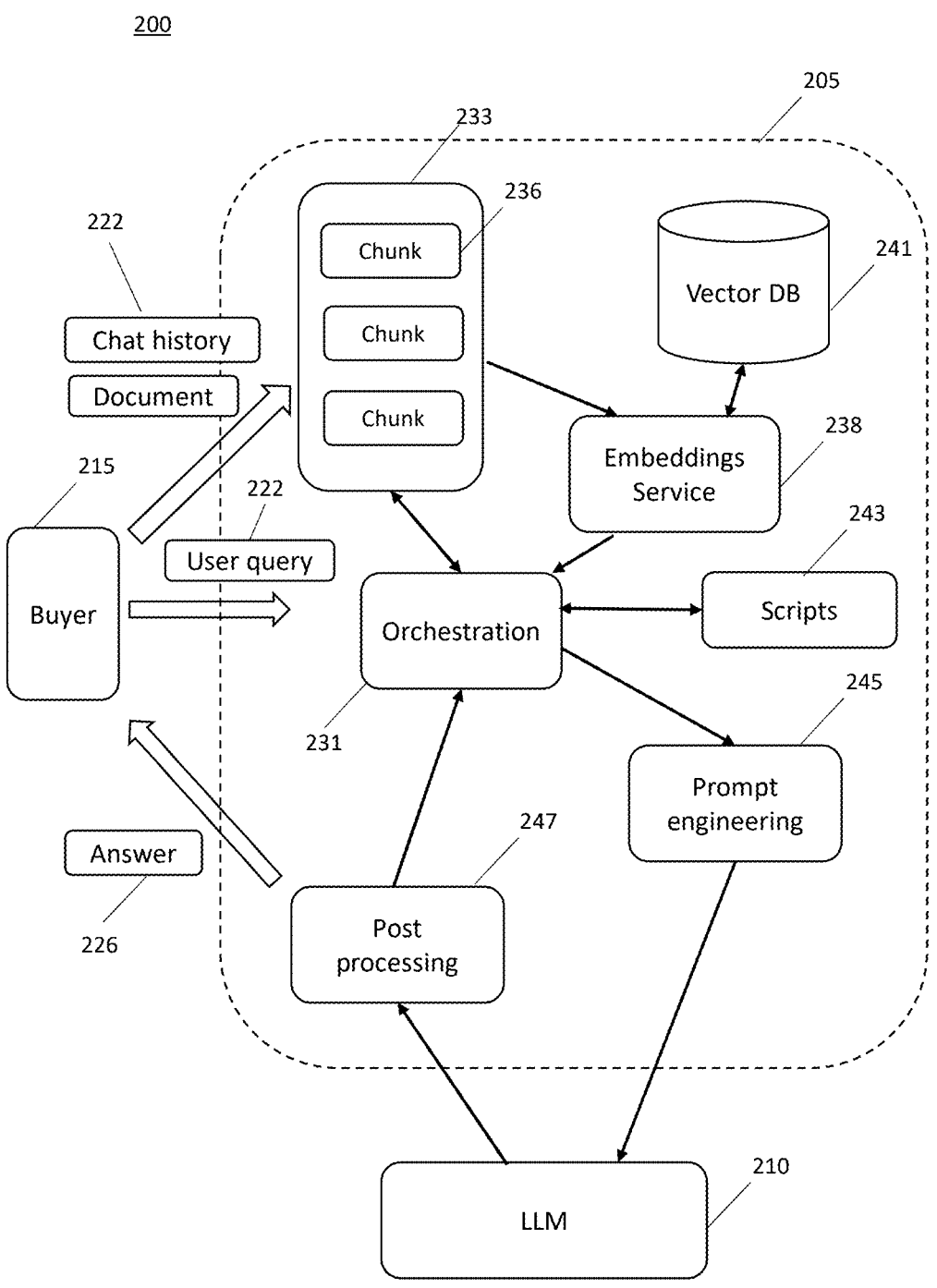
FIG. 2 is a schematic diagram of a Source-to-Pay platform for managing user queries and interacting with the LLM, according to an example.

FIG. 2 is a schematic diagram of a Source-to-Pay system according to an example. The Source-to-Pay system 200 includes a Source-to-Pay platform 205 which may be used by a user 215 to answer a procurement related user query using an external LLM 210. The user query 222 will be associated with context data such as chat history or a document provided by the user 224 as well as data stored within the platform such as contract documents and supplier catalogues 233. If required, the context data may be divided into chunks 236 for use with LLM prompts.

The Source-to-Pay platform 205 also comprises an embeddings service 238 and a vector database 241. The embeddings service 238 generates embeddings for chunks 236 as needed. The embeddings may be vector representations of words or groups of words in a chunk 236 which may be generated by analyzing the words in order to encode them with a meaning represented by a vector. The vector database 241 may comprise a number of semantic vectors against which the embeddings of a chunk may be compared. This may be useful when semantically filtering chunks 236 to identify only chunks relevant to the user query. For example, when the user query asks a question about a large document, the vectors associated with the chunks of that document may be compared with vectors in the vector database 241 which relate to the user query. In one example, if the user asks to identify part of a contract document associated with "termination", the vectors of each chunk may be compared with a vector in the vector database which is associated with "termination". Only relevant chunks may then be considered further. As the document may use a different word than "termination" to mean the same or similar concept, the use of vector-based searching improves the likelihood of finding all relevant parts of the document.

The Source-to-Pay platform 205 may also comprise a store of scripts for different use cases. For example, different scripts may be associated with different processing workflows depending on the intention of the user. For example, as noted above, a user query to summarize a document will require different processing than a query to translate a document. The Source-to-Pay platform 205 may be customized by adding new scripts corresponding to different processing workflows or additional functions such as guided user-interface workflows.

A prompt engineering function 245 is employed to generate and forward prompts to the LLM. In some cases, the prompts may be LLM-specific. The prompts will also depend on the processing workflow selected based on the user intent. The prompts may include chunks of context data together with predetermined or template questions. In some cases, a prompt may be used to determine user intent by including the user query and optionally some of the context data, such as chat history.

A post processing function 247 is employed to select and/or combine the responses from the LLM into an answer 226 to the user query 222. This post processing will be dependent on the workflow selected. Where the response is the user intent, this may then be used to determined which processing workflow to select in order to process the chunks of context data associated with the user query.

The platform comprises a controller or orchestration function 231 which manages the various aspects of the platform 205 in order to answer the user query 222 using LLM 210. The orchestration function 231 determines whether the context data and estimated response is too large for an LLM transaction and determines how to divide the context data into smaller chunks. The orchestration function also determines the user intent from the user query (and in some cases some or all of the context data), which as noted previously may involve forwarding a predetermined prompt including the user query to the LLM (or a different specialized user intent determination LLM). The orchestration function 231 then controls how the chunks are processed and incorporated into prompts to be forwarded to the LLM, and how responses from the LLM are handled in order to provide the answer 226.

Figure 3:
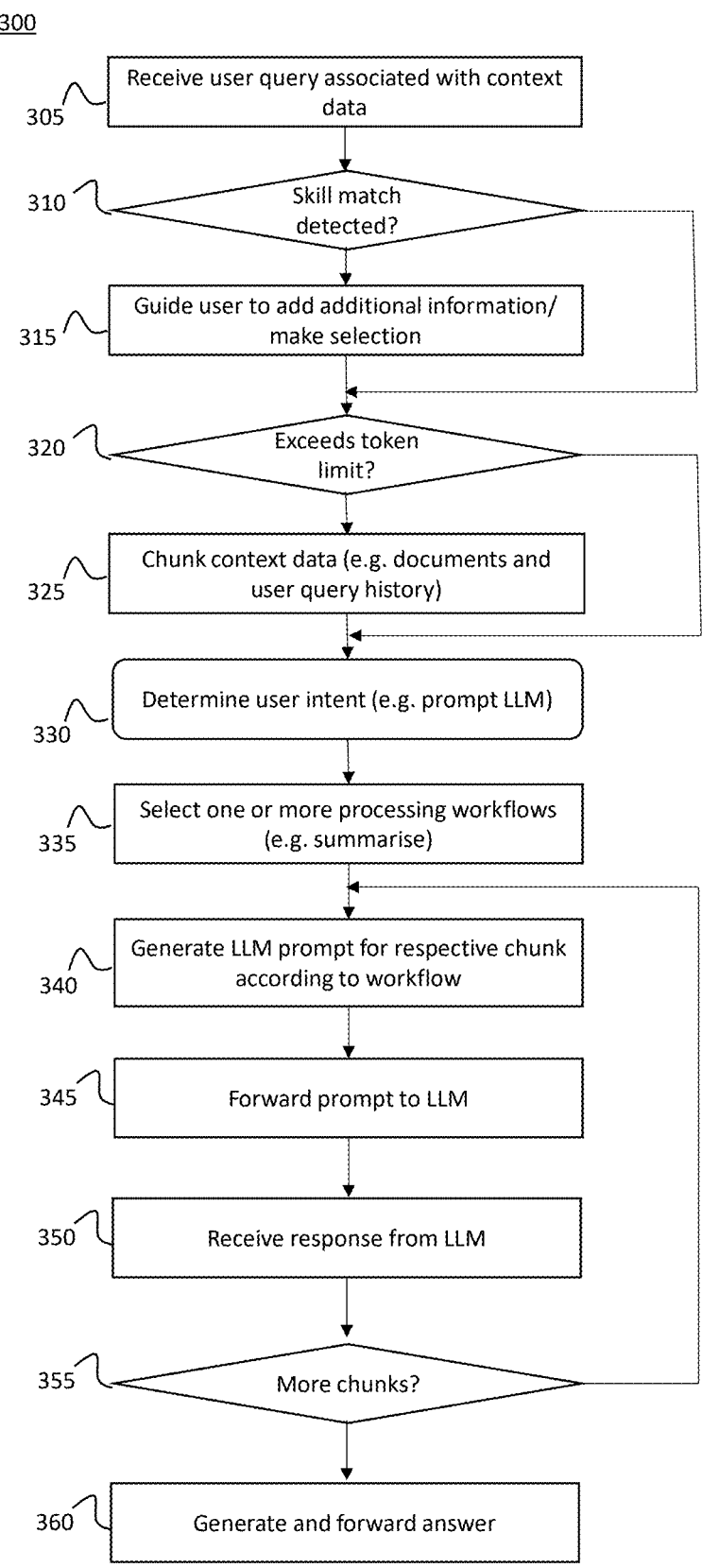
FIG. 3 is a flowchart of a method of answering a user query in a Source-to-Pay platform using an LLM, according to an example.

FIG. 3 is a flowchart of a method of using an LLM to answer a user query in a Source-to-Pay platform, such as the Source-to-Pay platforms of FIG. 1 or FIG. 2. The method 300 may be implemented using any suitable hardware such as a processor, memory, databases and user interfaces. At 305, the method comprises receiving a user query associated with context data. The user query may be provided as part of an interactive chat session, entered as part of a form or selected as a pre-configured function within a GUI. The user query may include or reference other data such as one or more documents and ask questions such as "summarize document X", "compare documents X and Y", find products that match criteria A, B, C.

The user query will be associated with context data which is used to generate prompts for the LLM. The context data may include the data included in or referred to in the user query such as specific documents. The context data may include chat history which may be useful in clarifying user intent. The context data may also include historical or category information about the user such as the marketplace they usually interact with. The context data may include Internet search results relating to the chat history, historical or category information.

At 310, the method detects whether there is a skills match. A skill as used herein is a preconfigured input workflow that assists a user with performing a predefined action, such as adding a new supplier. A user may not know how best to do this, and a skill can be defined as a workflow requesting specific types of information to enable better query answers and/or to simply add new data to the platform. A skill may differ from a processing workflow as it may involve a conversational interaction with a user to collect input necessary to execute a task. The method may detect a potential skills match by querying the user intent with the LLM using the original user query and context data. Alternatively, a trigger words corresponding to a skill may be detected in the user query. If a skills match is detected, the method moves to 315 where the user is offered the skill. If accepted, the user is then guided through the associated input workflow to gather useful additional information, such as supplier address and product category. This may be implemented using a question-and-answer chat session or a form provided in a GUI. If there is no match, the method moves to 320.

At 320, the method estimates the number of tokens required for an LLM transaction involving the context data. Various tools are available to estimate token numbers, such as tiktoken at https://github.com/openai/tiktoken If the estimated number of tokens exceeds a per transaction token limit for the LLM, the method moves to 325. If the estimated number of tokens doesn't exceed a per transaction token limit for the LLM, the method moves to 330.

At 325, the context data associated with the user query is divided into context data parts or chunks. For example, a large document may be divided into smaller sections each having less than a predetermined number of words for example. Each of these chunks may be included in separate LLM prompts and correspond with an estimate LLM transaction token size lower than the LLM transaction token limit. In order to improve operation of the method, documents may also be divided based on other considerations such as separating one chunk from another only at the end of a paragraph, section or page, rather than in the middle of a sentence for example. Chunks may overlap by some quantity of words to ensure contextual connectivity and relevance between them. A segmentation service may be used to segment a contract document into clauses and the document may then be divided into a plurality of chunks each having whole numbers of clauses.

At 330 the method determines the user intent, that is what the user query is likely to want to achieve. Examples include summarize a document or content pasted into the user query, translate, compare, and/or ask questions of a document. The intent may be determined using an appropriate predetermined prompt template and adding the user query and some of the context data, such as chat history and/or whether a skill has been used to complete the user query. Other approaches may parse the user query in order to identify key words. If a user intent cannot be identified, an error message may be returns asking the user to reformulate the user query. Determining the user intent may be similar to detecting a skills match in 310, but this is used for a different purpose.

This may be implemented by trying to match user intent with one or more of a plurality of predetermined user intent parameters. In an example, these user intent parameters may be provided in an LLM prompt together with the user query and asking whether the user query corresponds to one or more of the provided user intent parameters. For example, if the user query is to "Summarize section 4 of a document", it could mean (1) extract section 4 of a document, and then (2) summarize the content of the extracted section of the document. In this case, the intent detection leads to the sequential execution of two agents or two processing workflows applying two different methods, one specialized in extracting text from a longer document and another one specialized in summarizing a piece of text. If this is not found, an error message may be generating asking the user for additional explanation or to reformulate the user query.

At 335, the method selects a processing workflow based on the determined user intent (e.g. the selected user intent parameter). For example, if the response from the LLM prompt is that the user intent is to summarize a document, the method may select a summarize processing workflow. A number of predetermined workflows may be available to select from, for example translate a document, summarize a document, ask a question of a document. Each workflow may be provided as a script to be called in order to carry out a sequence of actions such as generate a first LLM prompt with a predetermined question and a first chunk. A subsequent action may include using the response to generate a new LLM prompt including a next chunk. Some processing workflows may filter the chunks in order to only use a sub-set of these in the prompts. Some examples processing workflows are described in more detail below.

At 340, an LLM prompt is generated for a respective chunk according to the workflow. As previously noted, this may include a chunk, a predetermined question, as well as other information gathered about the user such as the size of their company, location, or other information that may be useful in answering the particular user query.

At 345, the method forwards the prompt to the LLM. This may be implemented using a webservice having pre-established access to the LLM. At 350, the method receives a response from the LLM.

At 355, the method determines whether there are more chunks to process and if so, returns to 340. If there are no more chunks, the method moves to 360.

At 360, the method generates an answer to the user query and provides this to the user, for example content displayed via a GUI or as a continuation of a chat session, or as a link to a newly generated document. How each of the LLM responses are used to generate the answer will depend on the processing workflow selected.

Figure 4A:
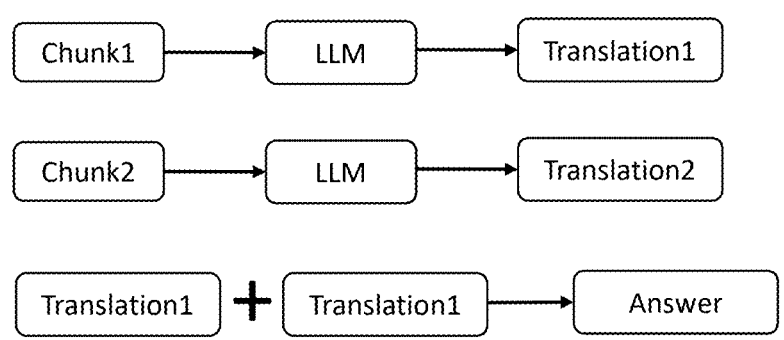
FIGS. 4a-4b illustrate processes for managing data using different workflows, according to an example.

FIG. 4a illustrates a "translate" processing workflow in which a first chunk (chunk1) is sent to the LLM together with an instruction to translate to a specific language (Translation1). A second chunk (chunk2) is sent separately to the LLM together with the same instruction and a translation of that chunk is received (Translation2). Once translations of all chunks are received from the LLM, these translations (Translation1, Translation2) are simply combined in the order in which the chunks were divided, and this combination provided to the user as an answer to the user query.

Figure 4B:
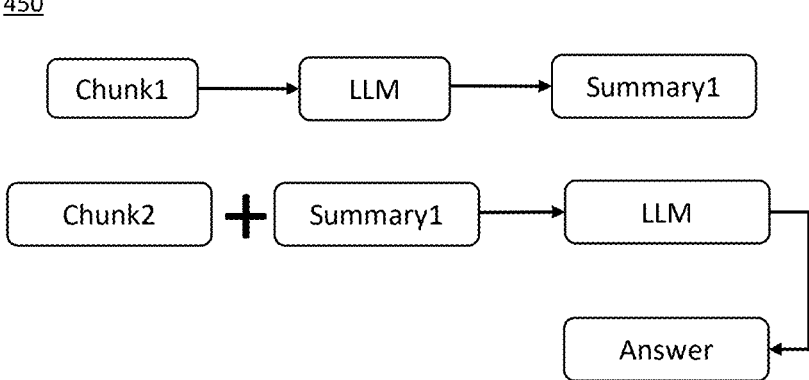

FIG. 4b illustrates a "summarize" processing workflow in which a first chunk (chunk1) is sent to the LLM together with an instruction to summarize, with the LLM providing a summary of this first chunk (Summary1). With the second, and any subsequent, chunks (chunk2), the LLM prompt includes the chunk itself (chunk2) together with the previously received summary (Summary1), as well as the instruction to summarize. This will return a summary (Summary2) of the combination of chunk2 and Summary1. Similarly, if a third chunk (chunk3) is present, this would be included in a new prompt together with Summary2 and the instruction to summarize; and returning an updated summary (Summary3). The most recently received summary is then provided to the user as an answer to the user query.

The chunks are processed in different ways depending on the user intent. Translations of chunks can be handled independently and then simply combined as information in one chunk is not needed for translating another chunk. However independently summarizing separate chunks and then trying to combine them is unlikely to provide a summary of the whole document as the contents of one chunk or part of the document may be related to and/or influence the meaning of another chunk.

Figure 5A:
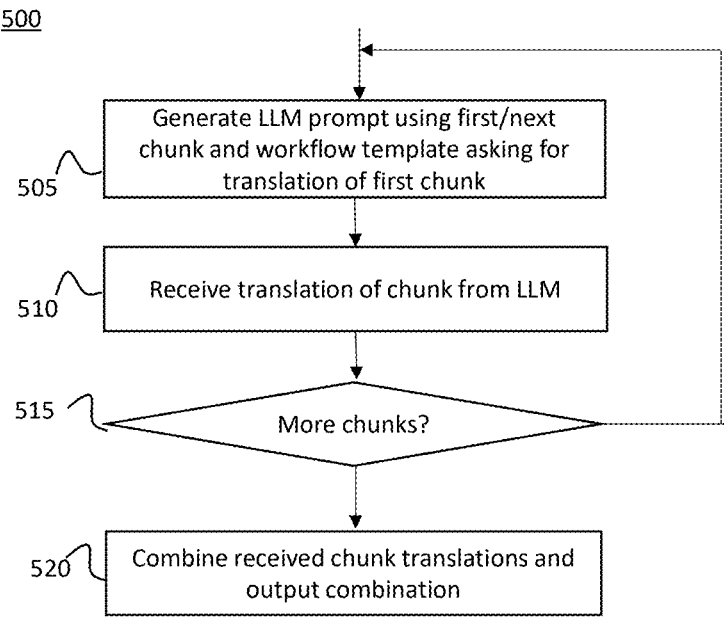
FIGS. 5a-5c are flowcharts illustrating different workflows, according to an example.
Figure 5B:
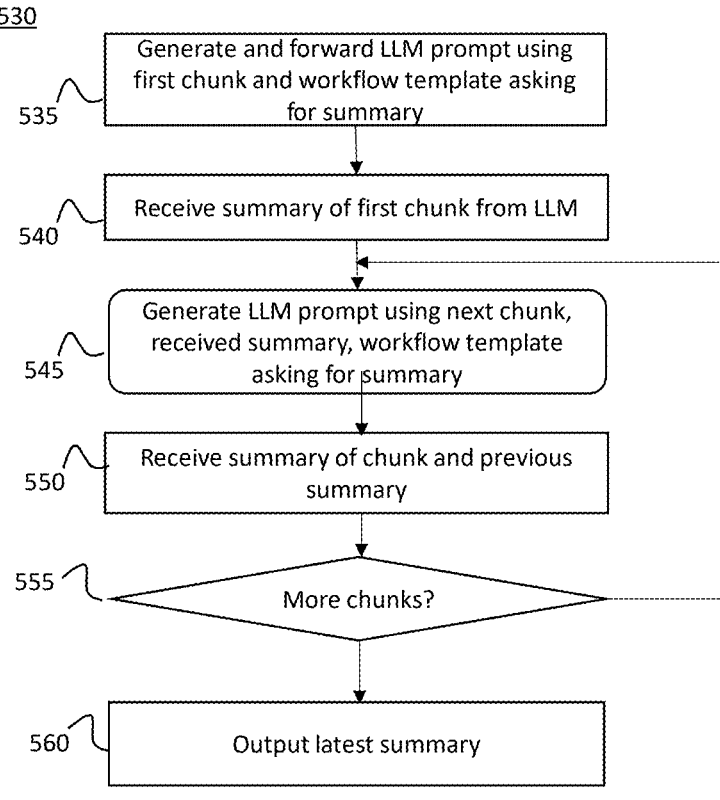

Methods corresponding to these workflows are illustrated in FIGS. 5a and 5b. FIG. 5a illustrates a method of translating a document. The method 500 may be implemented as a script which is called when an appropriate user intent is detected. This script may be provided with the Source-to-Pay platform, or may be a custom developed script generated by a user and which may be related to a specific workflow routinely used by that user.

At 505, the method generates a first LLM prompt for a first chunk using a processing workflow template. The template may be a simple command such as "translate the following content into French", after which the content of the chunk is inserted.

At 510, the method receives the translation from the LLM. At 515, the method checks if any more chunks need processing and if so returns to 505. Otherwise, at 520, the method combines the received translations in chunk order and presents the result to the user.

FIG. 5b illustrates a method of summarizing a document. The method 530 may be implemented as a script which is called when an appropriate user intent is detected. This script may be provided with the Source-to-Pay platform, or may be a custom developed script generated by a user and which may be related to a specific workflow routinely used by that user.

At 535, the method generates a first LLM prompt for a first chunk using a workflow template. The template may be a simple command such as "summarize the following content", after which the content of the chunk is inserted.

At 540, the method receives the summary of the first chunk. At 545, the method generates a new prompt using the received summary and the next chunk. This may be implemented using a workflow template having the same simple command such as "summarize the following content" after which the content from the received summary and the next chunk are inserted.

At 550, the method receives a summary of the content of the previous summary combined with the next chunk. At 555, the method checks if any more chunks need processing and if so returns to 545. Here the content of the next chunk is combined with the content of the last received summary and the LLM is prompted to summarize the combined content.

At 560, once all chunks have been processed, the method simply provides the latest received summary as the output.

Figure 5C:
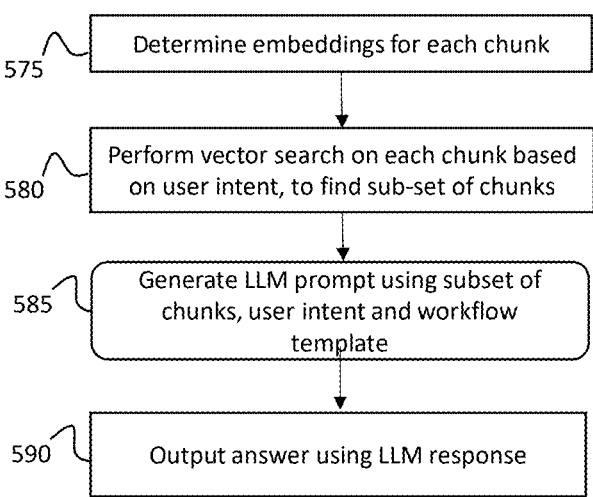

FIG. 5c illustrates a method of asking a question of a document. The method 570 may be implemented as a script which is called when an appropriate user intent is detected. This script may be provided with the Source-to-Pay platform, or may be a custom developed script generated by a user and which may be related to a specific workflow routinely used by that user At 575, the method determines embeddings for each chunk. The embeddings may be at the chunk, sentence and/or word level. Embeddings may be used from many sources, such as OpenAI or other third-party sources as well as proprietary models.

At 580, the method performs a vector search on each chunk based on user intent. For example, if the user query asks to identify risks in a large contract document or documents, the vector search may filter the associated chunks so that only a sub-set of those chunks having meanings (vectors) associated with risk are further processed. The search may filter out chunks which do not have any vectors within a given distance of a vector associated with the word "risk".

At 585, the method generates and forwards an LLM prompt using the subset of chunks. For example, a template instruction may ask "Identify [user intent] in the following content", and the method then inserts the user intent or question such as "risk" into the instruction followed by the content of the chunk.

At 590, the method outputs the response received from the LLM. In some examples this may be implemented simply by providing directly the final output from the LLM response. In some other examples, different types of post-processing may be employed. For example, the LLM response may be cleaned up to comply with strict coding rules in HTML, JSON, SQL, or XML so that it can be executed programmatically by another process or system.

Figure 6:
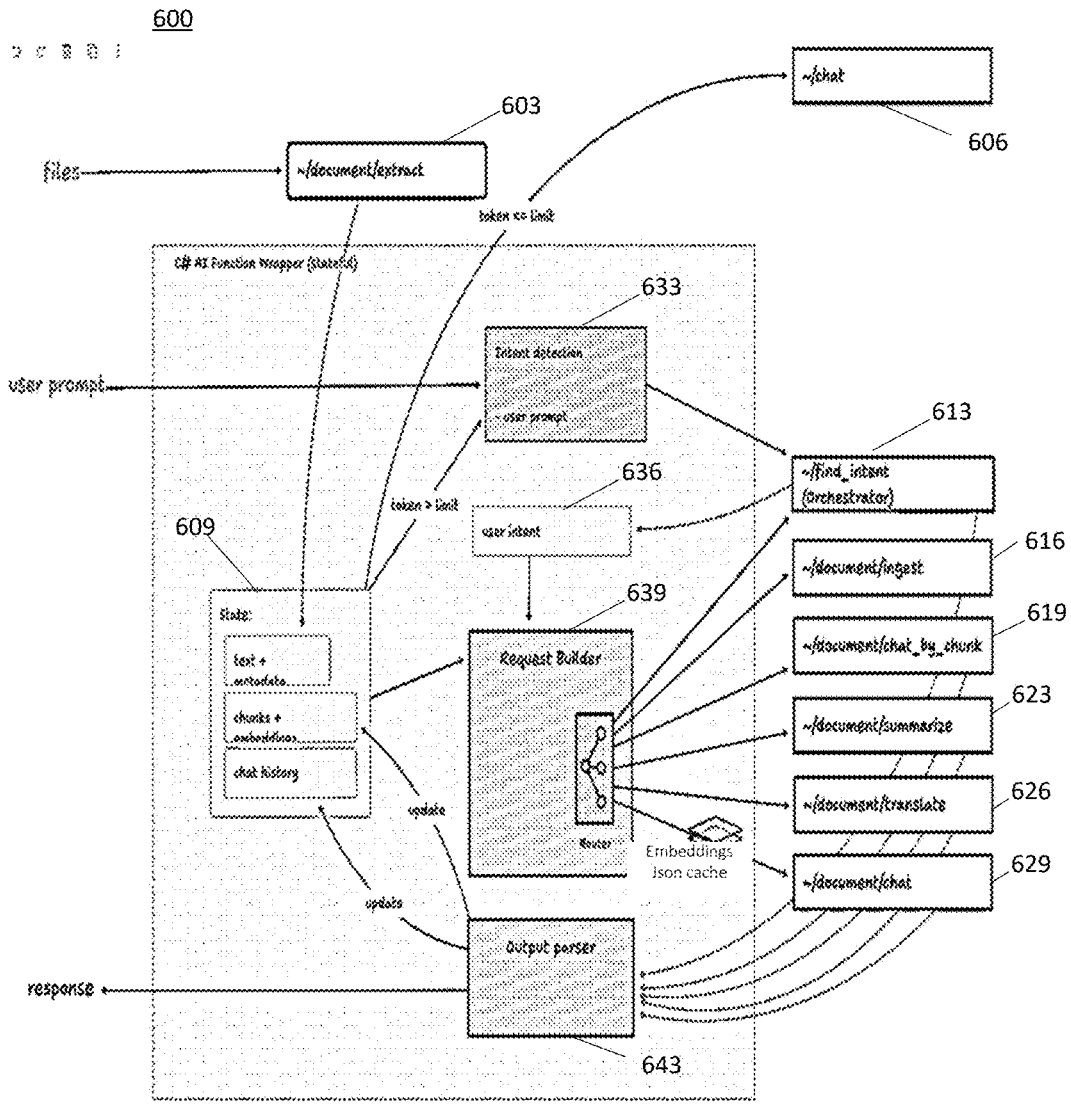
FIG. 6 is a schematic of part of a Source-to-Pay platform for answering user queries, according to an example.

FIG. 6 illustrates a functional schematic of a Source-to-Pay platform according to an example. The functional blocks may be implemented in the Source-to-Pay platform of FIGS. 1 and 2.

The Source-to-Pay platform 600 comprises a document extraction function 603 which extracts text from any document imported into the platform, for example using Optical Character Recognition (OCR). The extracted text may be stored as data within the platform along with other data useful for operating the platform. The collective data of the platform is represented by the platform state 609 and may additionally include chat history for different users of the platform and well as data generated by the platform, such as document chunks and embeddings.

A chat endpoint 606 is used to check whether the text of the document is too long to be included in an LLM prompt. This may be implemented by estimating the number of tokens in an LLM transaction involving the document; for example, using Tiktoken. An intent detection function 633 determines a user intent in received user queries or prompts. This function transforms the data in the user query into one or a number of predetermined user intent parameters, and associating these two data in the state 609. This may be implemented in an LLM based find intent function 613 which uses a predetermined processing workflow which generates an LLM prompt using a template prompt with the user query text inserted. This may ask the LLM to determine whether the user intent can be allocated to one or more of a plurality of predetermined user intent parameters. Examples include "translate document", "summarize document", "ask document a question", "add new supplier", etc. The workflow may then return the user intent parameter 636 based on the response from the LLM to the prompt, or indicate an error if the LLM is unable to allocate the user intent to one of the predetermined parameters.

Depending on the user intent, the platform may use a request builder 639 to generate an appropriate LLM prompt, or perform some other action such as run a script to facilitate user entry of additional information such as enabling the set-up of a new supplier by obtaining all of the required data from the user, either using a predetermined form or as a guided chat sequence. In an example, the /find_intent endpoint sends back the signature of the next endpoint to call (for example translate or summarize). From this signature the request builder builds a request and sends this back to a Web service with all the parameters (e.g., text, prompt . . . )

The request builder may utilize one of a number of scripts, workflows or templates 616, 619, 623, 626, 629 to generate one or more prompts for the LLM. Summarize and translate workflows have been previously described. In an example, the endpoint/document/ingest extracts text, splits by chunk and converts to embeddings, then sends back these chunks with embeddings to the Buyer (user interface). The endpoint Document/chat_by_chunk asks the same questions for all the chunks. For example, if the user asks for an obligation→the endpoint ensures that this question is asked for all the chunks before summarizing all the results The LLM prompts are forwarded to an LLM, and responses received. The workflows may select one of the responses or combine all of the responses to generate an answer to the user query.

An output parser 643 may be used to interpret one or more of the LLM responses. In an example, the output parser may be able to parse the response to ensure it complies strictly to a predetermined coding format such as JSON, SQL, HTML, or XML. This improves handling of LLM responses which sometimes contain extra-text, for example if the user requests a SQL to make a query, the LLM response can respond with 'Here is your SQL+then SQL'. The output parser may implement logic to provide a strict code output that can be readily executed in a programmatic manner by another process.

The platform 600 may use an external embeddings service to generate semantic vectors for some of the data in the state 609, for example document chunks. This embeddings information may be used by some of the workflows 619-629 to help generate LLM prompts and/or to filter the data to be included in the prompts. In an example, document chunks may be filtered into a sub-set based on the detected user intent 636 and only sub-set of chunks used to generate LLM prompts. If the user asks a question of the document such as identify contract terms related to termination, then embeddings may be used to identify only those contract chunks relating to termination, for example by generating a semantic vector for "termination" and searching for any vectors associated with document chunks that are within a predetermined distance of the termination vector.

Figure 7:
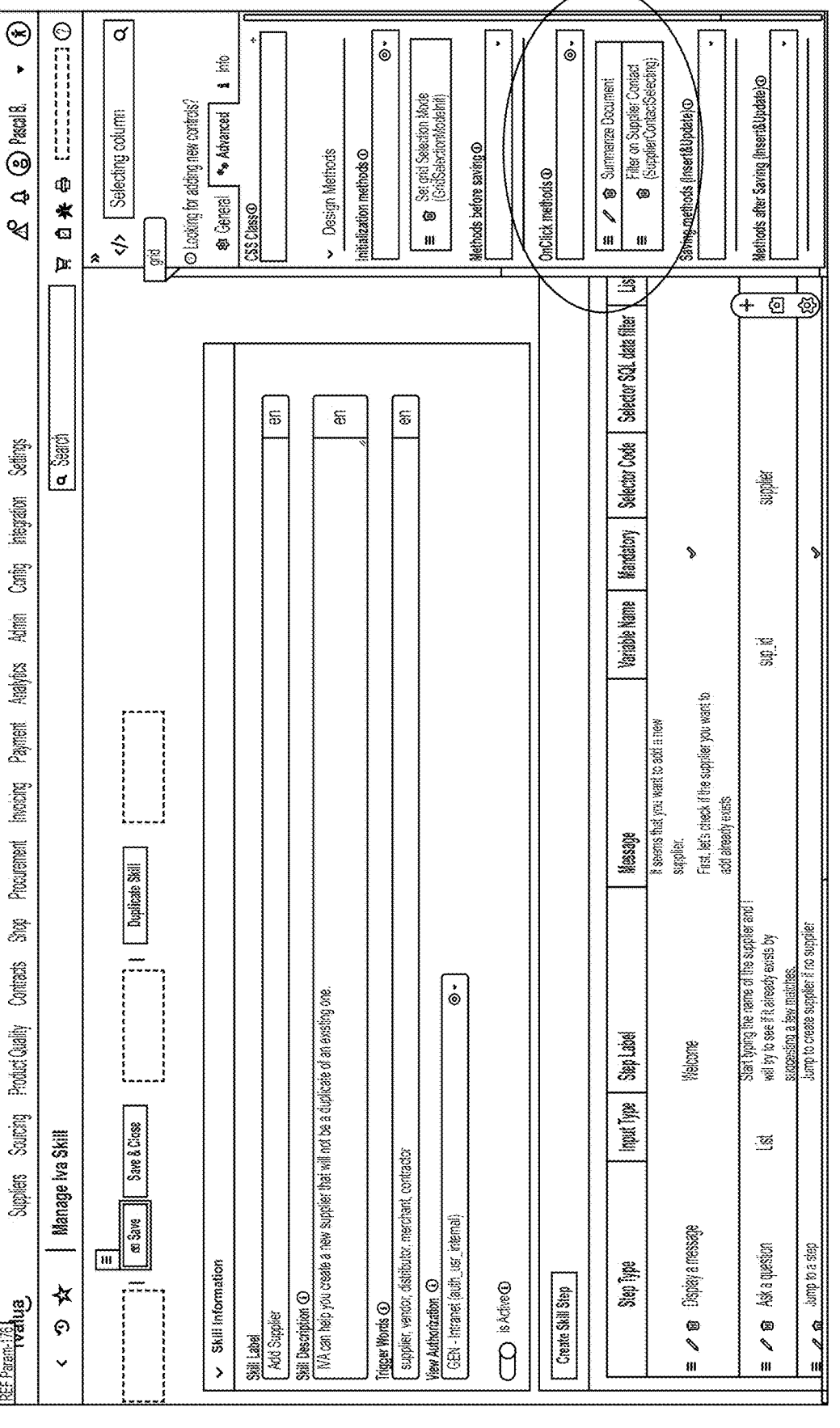
FIG. 7 is a screenshot of a user interface, according to an example.

FIG. 7 illustrates a screenshot illustrating an example GUI which may be used by a configurator to add a skill or user-configured function for a Source-to-Pay platform. Once defined, the user-configured function may simply be added to a screen of the GUI as a end-user actionable button, without the need for any recoding of the platform, or coding to implement the user-configured function. This type of additional functionality may be implemented, for example, in any of the Source-to-Pay platforms of FIG. 1, 2 or 6.

In order to add a skill, in an example the configurator adds a description and keywords or other triggers. These may be used to match and suggest the skill (once configured) to an end-user based on user inputs to the Source-to-Pay platform. The configurator then adds a sequence of steps for the skill to execute when selected. The steps may be chosen from a predetermined set with the ability to add content, such as display a message and ask a question.

In an example, a configured skill may be used to receive a constrained user input (e.g. using forms and/or chat questions/answers) and from this an optimal LLM prompt is generated. The LLM response may then be further processed by the skill and returned to the user. In another example, a platform configurator or administrator may wish to add a new function "add supplier" which guides non-expert end-users of the platform through a defined workflow for adding a supplier to ensure that all appropriate information is captured and to simplify the process for the non-expert end-user. The configured function or skill defines a series of steps for a user to enter information and may include other features such as using a template to define a LLM prompt which includes specific types of information in a specific order with a request to provide the answer in a useful format.

Example skills code is provided below:

```
"skills": [
    {
        "skill_guid":          "EE49D548-B680-ED11-B8E2-
            00155DB48D0E",
        "skill_label": "Create Contract",
        "skill_desc": "This skill allows a non casual user to be
            guided to create a new contract with a new document
            from a template or from a uploaded attachment.",
        "trigger_words": [
            "create contract",
            "contract",
            "agreement",
            "legal"]
    ]
},
{
    {"skill_guid":          "F049D548-B680-ED11-B8E2-
        00155DB48D0E",
    "skill_label": "Training demo",
    "skill_desc": "Demo for the various skill step types
        available.",
    "trigger_words": [
        "demo type"
    ]
},
{
    {"skill_guid":          "F149D548-B680-ED11-B8E2-
        00155DB48D0E",
    "skill_label": "Guided Buying",
    "skill_desc": "This is very simple intake form to guide
        a user to the Shopping page or a new Purchase
        Request.",
    "trigger_words": [
        "buy",
        "items",
        "good",
        "item",
        "services"
    ]
},
{
    "skill_guld":          "F349D548-B680-ED11-B8E2-
        00155DB48D0E",
    "skill_label": "Add Supplier",
```

13

"skill_desc": "IVA can help you create a new supplier
   that will not be a duplicate of an existing one.",
"trigger_words": [
   "supplier",
   "vendor",
   "distributor",
   "merchant",
   "contractor"
]
},
{
   "skill_guid":            "6A50E383-1F07-EE11-B8E8-
      00155DB48D0E",
   "skill_label": "Legal Assistant",
   "skill_desc": "As a legal assistant, I can complete or
      generate clause language for you.",
   "trigger_words": [
      "clause",
      "completion",
      "complete",
      "legal",
      "agreement",
      "contract"
   ]
},
{
   "skill_guid":            "2E6611B3-036E-EE11-B8EE-
      00155DB48D0E",
   "skill_label": "Category Monitor",
   "skill_desc": "I can search the internet to build market
      intelligence for a particular commodity, including
      price fluctuations, supply disruption, regulatory
      changes, compliance risk. This market intelligence
      should be useful for a category manager to develop
      appropriate risk mitigation and action plans.",
   "trigger_words": [
      "market intelligence",
      "commodity strategy",
      "price index",
      "supply disruption events"
   ]
}
]

The ability for a configurator or an administrator to configure their own bespoke functions, without writing code, improves the usability and functionality of the underlying platform, making it better suited to individual end-user needs and organizations depending on their own implementation objectives, unique processes, and maturity. The added configuration ability may be implemented without the need for any coding by the configurator or the administrator.

At least some aspects of the embodiments described herein with reference to FIGS. 1-7 comprise computer processes performed in processing systems or processors. However, in some examples, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

In the preceding description, for purposes of explanation, numerous specific details of certain examples are set forth. Reference in the specification to "an example" or similar language means that a particular feature, structure, or characteristic described in connection with the example is included in at least that one example, but not necessarily in other examples.

The above examples are to be understood as illustrative. It is to be understood that any feature described in relation to any one example may be used alone, or in combination with other features described, and may also be used in combination with one or more features of any other of the examples, or any combination of any other of the examples. Furthermore, equivalents and modifications not described above may also be employed.

What is claimed is:

1. A computer-implemented method of using a large language model (LLM) in a Source-to-Pay platform; the method comprising:
   receiving, by a processor of a server computer, a user query from a user device, the user query associated with a context data;
   determining, by the processor of the server computer, a user intent parameter using the user query;
   estimating, by the processor of the server computer, a number of tokens for processing the context data in a transaction associated with the LLM;
   responsive to the processor of the server computer determining that the estimated number of tokens exceeds a maximum number of tokens per transaction associated with the LLM, the processor of the server computer dividing the context data into a plurality of context data parts, each context data part having an estimated number of tokens below the maximum number of tokens;
   selecting, by the processor of the server computer, one or more of a plurality of predetermined processing workflows based on the user intent parameter;
   processing, by the processor of the server computer, the context data parts according to the selected processing workflow to generate one or more LLM prompts comprising respective context data parts;
   transmitting, by the processor of the server computer, the one or more LLM prompt to the LLM and receiving respective response data from the LLM;
   processing, by the processor of the server computer, at least some of the received response data to generate user response data;
   transmitting, by the processor of the server computer, a user response message to the user device, the user response message based on the user response data.

2. The method of claim 1, wherein the estimating a number of tokens associated with the context data comprises estimating the number of tokens for the LLM responding to the user query.

3. The method of claim 1, wherein the selected processing workflow causes the processor of the server computer to process the response data associated with one LLM prompt and adds the processed response data to another LLM prompt.

4. The method of claim 3, wherein the selected processing workflow causes the processor of the server computer to receive first response data for a first LLM prompt for a first context data part and to add at least a part of the first response data to a second LLM prompt comprising a second context data part.

5. The method of claim 1, wherein the processor of the server computer to:

semantically filter the plurality of context data parts to identify a subset of context data parts depending on the user intent and the context data parts, and generate LLM prompts for the subset.

6. The method of claim 5, wherein the semantic filtering comprises determining embeddings for each context data part and performing a vector search on the embeddings of each context data parts to determine the subset of context data parts, the vector search based on the user query.

7. The method of claim 1, wherein the processor of the server computer to:

generate a set of instructions based on a template and the selected processing workflow;

add the set of instructions to the one or more LLM prompts.

8. The method of claim 7, wherein the processor of the server computer to:

present to the user one or more questions and receive respective user responses;

process the one or more user responses to generate additional user query data and adding the additional user query data at least one of the one or more LLM prompts.

9. The method of claim 1, wherein the processor of the server computer to determine the user intent parameter:

obtaining content data associated with the user;

forwarding a user intent prompt to the LLM, the user intent prompt comprising the user query and at least some of the obtained content data;

receiving response data from the LLM and using the response data to determine the user intent parameter.

10. The method of claim 1, wherein the processor of the server computer to generate the user query using a user input workflow to prompt a user to input a predetermined sequence of query data.

11. A Source-to-Pay platform for use with a large language model (LLM), the platform having a processor and memory comprising processor readable instructions which when executed on the processor, cause the processor to:

receive a user query from a user device, the user query associated with a context data;

determine a user intent parameter using the user query;

estimate a number of tokens for processing the context data in a transaction associated with the LLM;

responsive to determining that the estimated number of tokens exceeds a maximum number of tokens per transaction associated with the LLM, divide the context data into a plurality of context data parts, each context data part having an estimated number of tokens below the maximum number of tokens;

select one or more of a plurality of predetermined processing workflows based on the user intent parameter;

process the context data parts according to the selected processing workflow to generate one or more LLM prompts comprising respective context data parts;

transmit the one or more LLM prompts to the LLM and receiving respective response data from the LLM;

process at least some of the received response data to generate user response data;

transmit a user response message to the user device, the user response message based on the user response data.

12. The Source-to-Pay platform of claim 11, the processor to process the response data associated with one LLM prompt and add the processed response data to another LLM prompt.

13. The Source-to-Pay platform of claim 12, the processor to receive first response data for a first LLM prompt for a first context data part and to add at least a part of the first response data to a second LLM prompt comprising a second context data part.

14. The Source-to-Pay platform of claim 11, the processor to:

semantically filter the plurality of context data parts to identify a subset of context data parts depending on the user intent and the context data parts, and generate LLM prompts for the subset.

15. The Source-to-Pay platform of claim 14, wherein the semantic filtering comprises determining embeddings for each context data part and performing a vector search on the embeddings of each context data parts to determine the subset of context data parts, the vector search based on the user query.

16. The Source-to-Pay platform of claim 11, the processor to:

generate a set of instructions based on a template and the selected processing workflow; and add the set of instructions to the one or more LLM prompts.

17. The Source-to-Pay platform of claim 16, the processor to:

display one or more questions to the user and receive respective user responses;

process the one or more user responses to generate additional user query data and adding the additional user query data at least one of the one or more LLM prompts.

18. The Source-to-Pay platform of claim 11, the processor to:

obtain content data associated with the user;

forward a user intent prompt to the LLM, the user intent prompt comprising the user query and at least some of the obtained content data;

receive response data from the LLM and use the response data to determine the user intent parameter.

19. The Source-to-Pay platform of claim 18, the processor to generate the user query using a user input workflow to prompt a user to input a predetermined sequence of query data.

20. A non-transitory computer-readable medium storing a program for using a large language model (LLM) in a Source-to-Pay platform, the computer-readable medium comprising instructions that, when executed by at least one processor, cause the at least one processor to:

receive a user query from a user device, the user query associated with a context data;

determine a user intent parameter using the user query;

estimate a number of tokens for processing the context data in a transaction associated with the LLM;

responsive to determining that the estimated number of tokens exceeds a maximum number of tokens per transaction associated with the LLM, divide the context data into a plurality of context data parts, each context data part having an estimated number of tokens below the maximum number of tokens;

select one of a plurality of predetermined processing workflows based on the user intent parameter;

process the context data parts according to the selected processing workflow to generate one or more LLM prompts comprising respective context data parts;

transmit the one or more LLM prompt to the LLM and receiving respective response data from the LLM;

process at least some of the received response data to generate user response data;

transmit a user response message to the user device, the user response message based on the user response data.

* * * * *